United States Patent [19]

Kuklinski

[11] Patent Number: 5,934,609
[45] Date of Patent: Aug. 10, 1999

[54] DEFORMABLE PROPELLER BLADE AND SHROUD

[75] Inventor: Robert Kuklinski, Portsmouth, R.I.

[73] Assignee: The United States of America as represented by the Secretary of the Navy, Washington, D.C.

[21] Appl. No.: 08/834,723

[22] Filed: Apr. 1, 1997

[51] Int. Cl.⁶ .............................. B64C 11/00; B64C 3/52
[52] U.S. Cl. ............................ 244/51; 244/52; 244/219; 244/75 R; 416/23
[58] Field of Search .................................. 244/17.25, 51, 244/52, 75 R, 219, 213, 214, 251; 411/20 R, 90 R, 24; 60/527–529; 310/330, 328, 333, 367

[56] References Cited

U.S. PATENT DOCUMENTS

| | | | |
|---|---|---|---|
| 2,918,978 | 12/1959 | Fanti | 244/219 |
| 3,042,371 | 7/1962 | Fanti | 244/219 |
| 3,930,626 | 1/1976 | Croswell, Jr. | 244/219 |
| 4,865,275 | 9/1989 | Thompson | 244/219 |
| 5,529,458 | 6/1996 | Humpherson | 244/219 |
| 5,662,294 | 9/1997 | Maclean et al. | 244/219 |
| 5,730,581 | 3/1998 | Buter et al. | 416/24 |
| 5,752,672 | 5/1998 | McKillip, Jr. | 244/17.25 |

FOREIGN PATENT DOCUMENTS

| | | | |
|---|---|---|---|
| 991183 | 10/1951 | France | 416/23 |
| 1042275 | 12/1991 | U.S.S.R. | 244/219 |

*Primary Examiner*—Galen L. Barefoot
*Attorney, Agent, or Firm*—Michael J. McGowan; Prithvi C. Lall; James M. Kasischke

[57] ABSTRACT

A propeller blade fabricated from composite material having a plurality of upper layers, each upper layer being flexible and having fibers oriented in a first direction. The material further includes a plurality of lower layers, each lower layer being flexible and having fibers oriented in a second direction which is different than the first direction of the fibers of the upper layers. A flexible layer of resistive heating material is disposed between the upper and lower layers. A control and power supply are provided for controlling the amount of electricity delivered to the layer of resistive heating material. The composite material changes its shape upon changing the temperature of the layer of resistive heating material by manipulating the controller.

12 Claims, 4 Drawing Sheets

DEFORMABLE PROPELLER BLADE AND SHROUD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to composite materials which move in response to environmental changes, such as changes in temperature, and more specifically to a composite material installed as part of a propeller blade which is capable of changing its shape upon being heated.

(2) Description of the Prior Art

The basic objective of the present invention is to optimize the operation of a propeller for various angles of attack. A propeller blade is an airfoil that operates at a fixed angle of attack. The angle of attack of a fixed airfoil is only optimal at a single forward speed or a single rotation speed for a propeller. The drop off in efficiency is significant for the off design operation of the propeller. Prior art means of controlling propeller blade or wing angle of attack such as flaps or other articulated devices that rely on moving parts are prone to problems associated with wear, control and generation of noise.

In this regard, variable camber blades are well-known in the art. Reference can be made to U.S. Pat. No. 3,042,371 to Fanti and U.S. Pat. No. 4,619,580 to Snyder as representative prior art in this field. The patent to Fanti discloses a blade having a trailing end portion with upper and lower bimetallic sheets that changes the blade's shape upon being subjected to varying temperatures of the fluid through which it is operating. Snyder shows a variable camber vane that is also capable of changing its overall shape upon being subjected to thermal variations of its working fluid.

A significant shortcoming with the blades of Fanti and Snyder is that they change shape only when the fluid in which they are operating changes its temperature. Thus, there is no independent means for changing the shape of the blade apart from varying the temperature of the working fluid. In operation of a vehicle, it is impractical to change the temperature of the working fluid.

Reference can also be made to U.S. Pat. No. 5,114,104 to Cincotta et al. which discloses a fin having a mechanically controlled system for changing its shape. The system incorporates shape memory alloys which are embedded within the fin for changing its shape during use. A disadvantage associated with this design is that it is costly to manufacture since the design requires several expensive moving parts and additional labor costs.

There is presently a need for a propeller blade mechanism that is capable of changing the shape of the blade by a simpler, more reliable means.

SUMMARY OF THE INVENTION

It is an object of the present invention to provide a propeller blade fabricated from a material which has no moving parts requiring assembly.

Another object is that of an improved propeller blade which is capable of changing its shape upon demand by varying the temperature of the blade.

A further object of the present invention is that of an improved propeller blade which is capable of changing its shape and therefore its angle of attack and noise signature.

Another object is that of an improved propeller blade which responds quickly in changing its shape upon being subjected to a temperature change by means of an element embedded within the propeller blade.

An additional object of the present invention is that of an improved propeller blade that can be mass produced.

Another object of the present invention is that of an light weight propeller blade, which is simple in design and easy to manipulate with common available power sources, e.g., electricity.

In general, the invention is directed to an improved propeller blade fabricated from composite material comprising a plurality of upper layers, each upper layer being flexible and having fibers oriented in a first direction. The material further includes a plurality of lower layers, each lower layer being flexible and having fibers oriented in a second direction which is different than the first direction of the fibers of the upper layers. A flexible layer of resistive heating material is disposed between the upper and lower layers, and suitable means is provided for heating the layer of resistive heating material. The composite material is adapted to change its shape upon heating the resistive heating material by the heating means wherein the fibers of the upper and lower layers expand or contract upon changing their temperature.

BRIEF DESCRIPTION OF THE DRAWINGS

A more complete understanding of the invention and many of the attendant advantages thereto will be readily appreciated as the same become better understood by reference to the following detailed description when considered in conjunction with the accompanying drawings wherein.

Corresponding reference numerals designate corresponding parts throughout the several views of the drawings.

DETAILED DESCRIPTION

Figure 1:
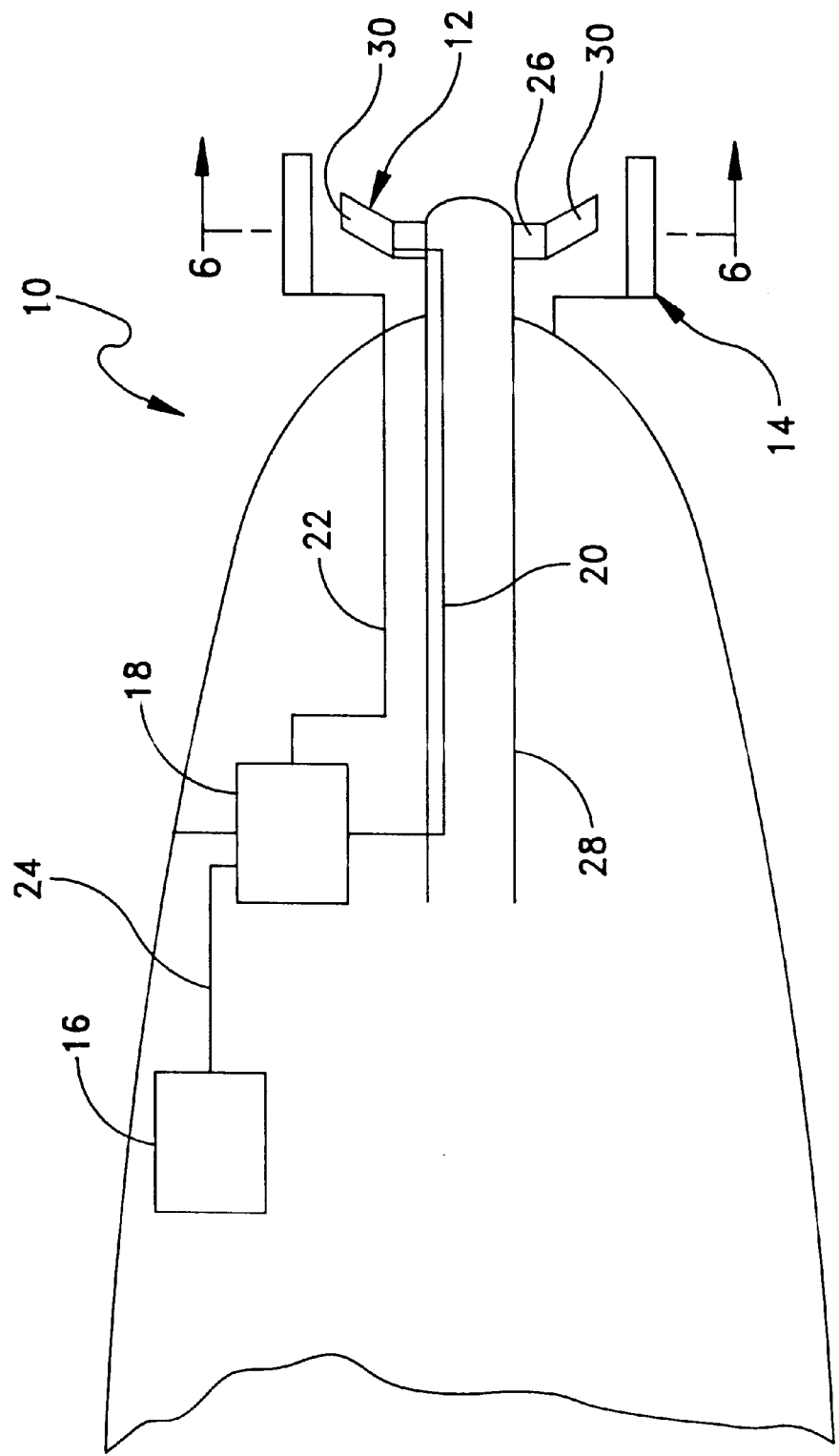
FIG. 1 is a schematic elevational view of a stern end of a vessel, e.g., a torpedo, having propeller and duct fabricated from the composite material of the present invention.

Referring to the drawings, and more particularly FIG. 1, there is generally indicated at 10 a vessel, e.g., a torpedo, having the composite material of the present invention incorporated into its propeller, generally indicated at 12, and duct, generally indicated at 14. A suitable power supply 16 and controller 18 deliver power and control the operation of the propeller 12 and duct 14 in a manner which will be fully described below. As shown, a wire 20 electrically connects the controller 18 to the propeller 12 and another wire 22 electrically connects the controller 18 to the duct 14. Also, the power supply 16 and controller 18 are suitably connected by wire 24. The controller 18 is designed to control the amount of electricity transmitted through the wires 20, 22 from the power supply 16.

As shown, FIG. 1 is a schematic view of the stern end of the vessel 10. The propeller 12 has a hub 26 for mounting it onto a propeller shaft 28 which is suitably driven by a motor (not shown) of the vessel 10. The hub 26 has mounted thereon a plurality of propeller blades each indicated at 30 which are fabricated in accordance with the present invention. The propeller 12 is received within the duct 14, in the traditional manner. The duct 14 is also fabricated in accordance with the current invention.

Figure 2:
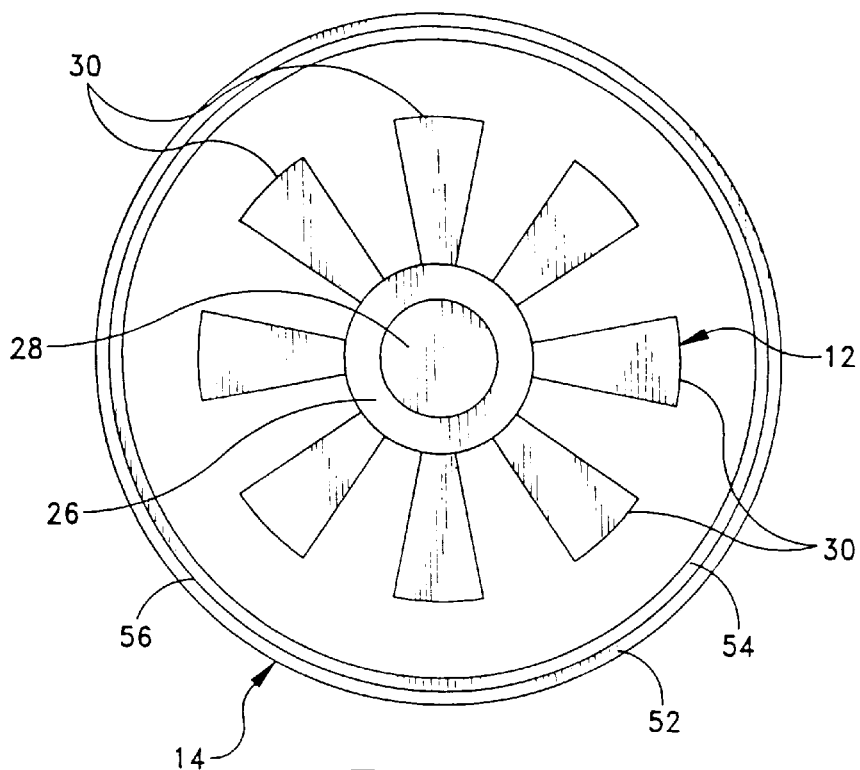
FIG. 2 is a rear end view of the propeller and duct of the vessel illustrated in FIG. 1.
Figure 3:
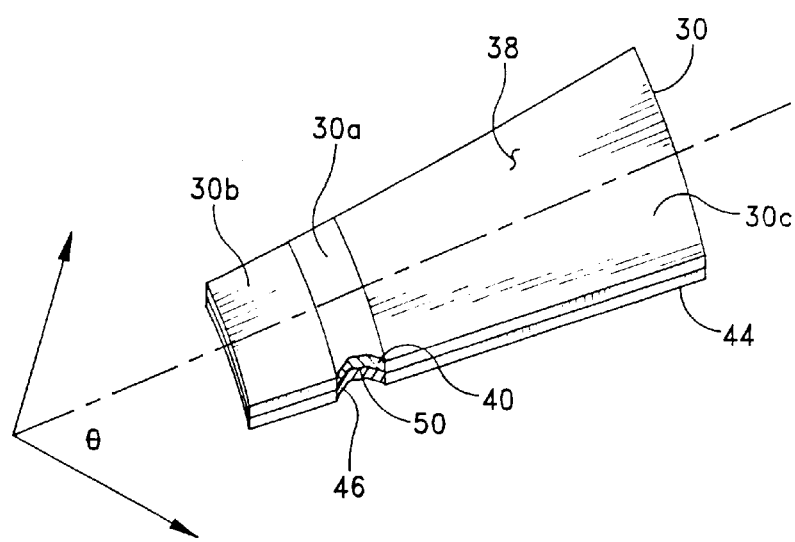
FIG. 3 is a top perspective view of a single blade of the propeller.
Figure 4:
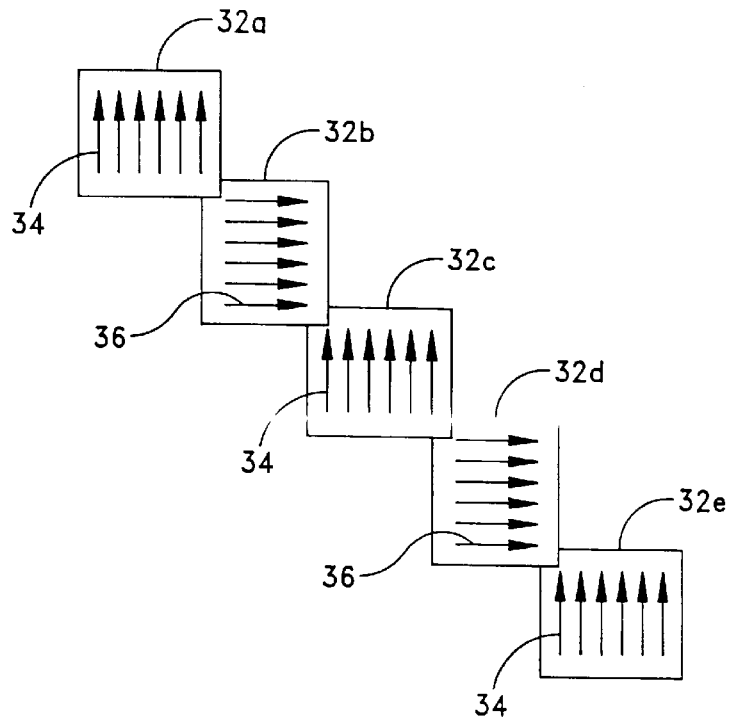
FIG. 4 is a schematic view of a prior art material having multiple layers with carbon fibers indicated by arrows, the layers being oriented in a well-known manner.

Referring to FIGS. 2 and 3, the propeller blades 30, as mentioned above, are fabricated utilyzing the present invention. The blades 30 are shaped in the usual manner to have an angle of twist so that water (or air) is displaced when the blades are rotated about the shaft's axis. FIG. 4 illustrates by a schematic view a traditional composite material which is made up of multiple layers 32a–32e having carbon fibers indicated by arrows 34, 36, the layers 32a–32e being oriented in a well-known manner. As indicated by arrows 36, the carbon fibers of one layer 32b are aligned perpendicularly with respect to the carbon fibers 34 of its adjacent layers 32a, 32c. This well-known construction provides strength and rigidity necessary for performance purposes.

Figure 5:
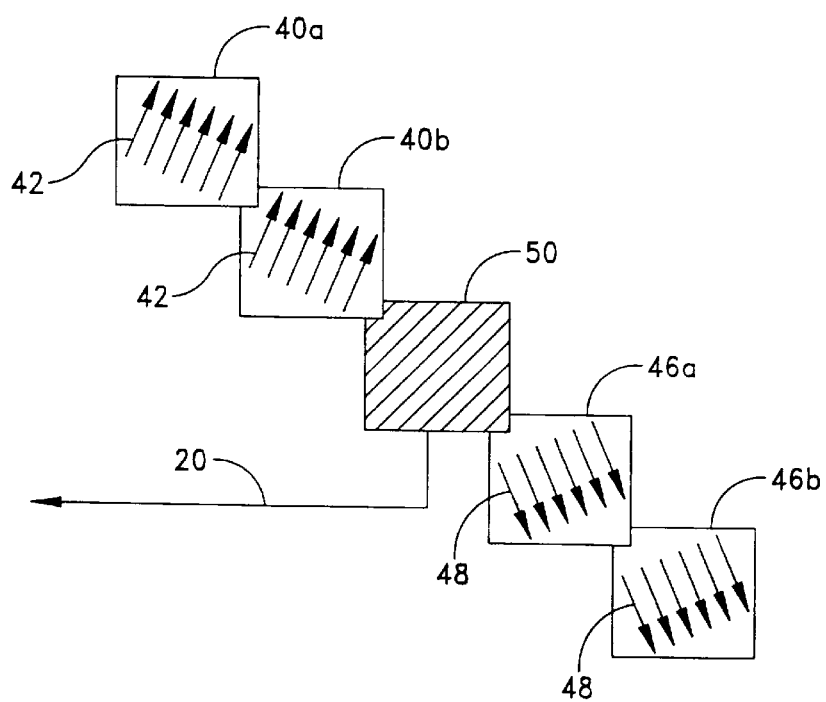
FIG. 5 is a schematic view of multiple layers of the composite material of the present invention illustrating with arrows the preferred orientation of carbon graphite fibers in the respective layers.

Referring particularly to FIGS. 3 and 5, the blades 30 of the present invention each have a first outwardly facing surface 38 and a second outwardly facing surface 44. The blade 30 includes an intermediate strip or section of material 30a fabricated from a plurality of first layers 40a, 40b, (FIG. 5) each of which is flexible and has fibers (as indicated by arrows 42) which are oriented in a first direction. The strip of material 30a also has a plurality of second layers 46a, 46b, each of which is also flexible and has fibers 48 which are oriented in a second direction which is generally angled with respect to the fibers 42 of the first layers 40a, 40b. The first and second flexible layers 40, 46 provide the strip of material 30a of blade 30 with the flexibility and rigidity required to propel the vessel 10. Preferably the first and second layers 40, 46 are fabricated from carbon graphite material. However, it should be understood that any other fibrous material which has fibers for orienting the layers 40, 46 in a particular direction may be used instead of carbon graphite material. The inner and outer end sections 30b, 30c, respectively, of the blade 30 are fabricated from the prior art composite material illustrated in FIG. 4.

A flexible layer of a resistive heating material 50 is disposed between the first and second layers 40, 46 at the strip of material 30a for changing the shape of the blade 30. More specifically, this heat resistive heating element layer 50 is preferably fabricated from aluminum and/or copper foil and is in thermal contact with the first and second layers 40, 46 for heating the layers and thereby changing the shape of the blade 30. Referring back to FIG. 1, the wire 20 is in electrical communication with the propeller 12 from the controller 18 so as to control, upon demand, the amount of heat being transmitted to the propeller blades 30.

The intermediate strip of material 30a deforms so as to change the angle of twist of the blade 30 in the following manner. Fibers 42, 48 of the first and second layers 40, 46, respectively, expand in their axial direction when heated by the layer of resistive heating material 50. With the conventional composite material of FIG. 4, the fibers 34, 36 in interleaved layers are oriented at right angles to each other.

Thus, any expansion of the fibers (e.g., fibers 34) is canceled out by the other layer fibers (e.g., fibers 36). In the strip of material 30a having the composite material of the present invention, the fibers 42, 48 are arranged around the heating element 50 so that when they deform, the strip 30a takes a different shape thereby causing the end of the propeller blade 30 to twist. It should be noted that the first and second layers 40, 46 can be staggered so as to accommodate differing amounts of twist. Obviously, the entire blade 30 can be constructed using composite material as in FIG. 5. Likewise, several independently controlled deformation regions can be applied on each blade.

It has been discovered that five watts per square inch will produce a forty degree temperature change across the blade 30. This temperature change causes the fibers 42, 48 to stretch along their axis thereby causing the blade to twist. For a blade 30 having, for example, seven first layers 40 and seven second layers 46, forty degrees of temperature change causes the pitch angle of the blade 30 to change five degrees.

Thus, it should be observed that each propeller blade 30 fabricated with the composite material of the present invention is capable of deforming to a desired shape upon command. More specifically, the pitch angle of the propeller blade 30 can be changed so that it is at its optimal angle of attack for the speed at which the vessel 10 is traveling. Such pitch angles are well-known in the art of water propulsion devices and will not be described herein for purposes of economy. It should be further observed that the noise signature of the vessel 10 can be changed at any time by merely changing the temperature of the layer of resistive heating material 50 for each propeller blade 30. This, of course, is controlled by the controller 18 which increases or decreases the amount of electricity delivered to the propeller 12 by the power supply 16.

Figure 6:
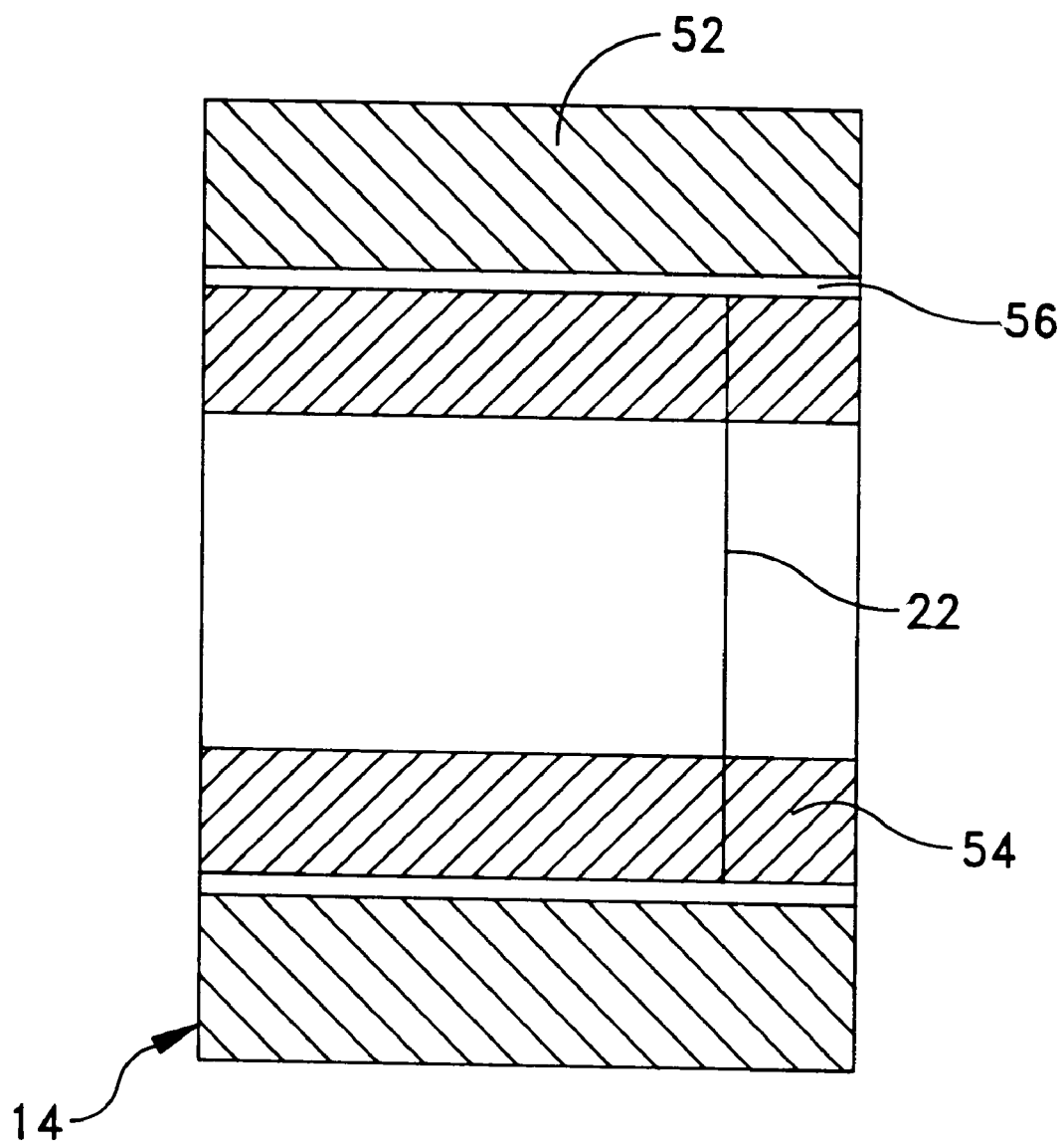
FIG. 6 is a side cross-sectional view of a shroud having the present invention embodied therein.

Referring now to FIGS. 2 and 6, the duct 14 is shown to comprise a plurality of outer layers 52 and a plurality of inner layers 54. A layer of a resistive heating material 56 is disposed between the outer and inner layers 52, 54, and operates in an identical manner as the layer of resistive heating element 50 for the propeller 12. This construction enables the duct 14 to curve and change its shape in the same manner as the propeller blades 30. Upon heating, duct 14 is deformed to position 58 thereby changing the flow characteristics through duct 14.

It should be noted that this construction can be used on a torpedo wherein an inflow temperature sensor (not shown) is used to provide information to the torpedo's controller 18 that supplies electric power to each propeller blade 30. This information is used to gauge how much power is supplied to each blade 30 for a given ambient condition. For most of the time during a torpedo mission, it operates at a search speed wherein no power is delivered to the layer of resistive heating material 50. At times, the torpedo 10 will operate prior to its ignition at attack speed wherein power is supplied to the layers 40, 46 via the layer of resistive heating material 50 so as to change the pitch angle of the blades 30. During either the attack or search speed, if power is supplied to the duct 14, the shape of the duct 14 will change. This change will cause the propulsion characteristics of the duct and propeller system to change. This change assists in achieving greater propulsion efficiencies in torpedo 10.

It should be further noted that a number of alternative devices can be constructed using the principles taught herein to construct air foils from composite material. For example, a fixed wing of an aircraft can be constructed of composite material so as to replace the traditional metal superstructure and flaps. Any application requiring propeller-like blades (such as fixed or rotary aircraft with propellers and turbomachinery) can utilize the composite material of the present invention.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A blade comprising:
   a first outwardly facing surface fabricated from a plurality of first layers, each first layer being flexible and having fibers oriented in a first direction;
   a second, opposite outwardly facing surface fabricated from a plurality of second layers, each second layer being flexible and having fibers oriented in a second direction;
   a flexible layer of heating material disposed between the first and second surfaces; and
   means for heating the layer of heating material, said heating material causing a temperature increase in said first and second surfaces, said fibers in said first and second layers expanding and said surfaces deforming to cause said blade to change its shape.

2. A blade as set forth in claim 1 the flexible layer of heating material being fabricated from a metallic foil.

3. A blade as set forth in claim 2 wherein said heating means comprises:
   a wire in electrical communication with the layer of heating material; and
   a power source electrically joined to said wire.

4. A blade as set forth in claim 2 wherein said first and second layers are fabricated from carbon graphite material.

5. A blade as set forth in claim 1 wherein said fibers of the first layer extend in a direction generally perpendicular to the direction of the fibers of the second layer.

6. A blade as set forth in claim 1 further comprising control means join to said heating means for controlling said heating means.

7. A blade comprising:
   an inner blade segment constructed from a conventional material;
   a deformation blade segment constructed from a temperature deforming material joined radially outward from said inner blade segment;
   an outer blade segment constructed from a conventional material joined radially outward from said deformation blade segment; and
   a heating means in contact with said deformation blade segment for heating said deformation blade segment, said heating means causing deformation of said deformation blade segment and twisting said outer blade segment with respect to said inner blade segment;
   said deformation blade segment comprising:
   a first outwardly facing surface fabricated from a plurality of first layers, each first layer being flexible and having fibers oriented in a first direction; and
   a second outwardly facing surface fabricated from a plurality of second layers, each second layer being flexible and having fibers oriented in a second direction;
   said heating means being a layer of heating material disposed between said first and second surfaces for applying heat to said surfaces whereupon said fibers in said first and said second layers expand and deforms said deformation blade segment.

8. The blade of claim 7 further comprising an electrical power source joined to said heating means wherein said heating material is a layer of resistive heating material.

9. The blade of claim 8 further comprising a controller joined between said electrical power source and said heating means for controlling the temperature of said heating material and the deformation of said deformation blade segment.

10. A rotor for a vehicle comprising:
    a hub;
    a plurality of blades disposed about said hub, each said blade deforming in response to temperature for allowing said plurality of blades to have an optimal angle of attack, each said blade having at least one deformation region therein for deforming said blade;
    a controller joined to said plurality of blades to control the temperature of said blades and the angle of attack of said blades; and
    a shroud joined to said vehicle about said hub and said plurality of blades, said shroud being deformable in response to temperature for changing the hydrodynamic characteristics of said shroud, said controller being further joined to said shroud to control said shrouds temperature and deformation;
    said shroud and said plurality of blades being constructed from a first outwardly facing surface fabricated from a plurality of first layers, each first layer being flexible and having fibers oriented in a first direction, a second outwardly facing surface fabricated from a plurality of second layers, each second layer being flexible and having fibers oriented in a second direction, and a layer of heating material disposed between said first and second surfaces, said controller being joined to said heating material for applying heat to said surfaces whereupon said fibers in said first and said second layers expand and deform said surfaces.

11. The rotor of claim 10 wherein said controller further comprises an electrical power source joined to said heating material wherein said heating material is a layer of resistive heating material.

12. The rotor of claim 11 wherein said controller independently controls the temperature in said plurality of blades and said shroud.

* * * * *